(12) United States Patent
Park

(10) Patent No.: US 11,642,963 B2
(45) Date of Patent: May 9, 2023

(54) APPARATUS AND METHOD FOR DIAGNOSING DAMAGE TO DRIVE-TRAIN HARDWARE OF VEHICLE

(71) Applicants: Hyundai Motor Company, Seoul (KR); Kia Corporation, Seoul (KR)

(72) Inventor: Se Hoon Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/486,588

(22) Filed: Sep. 27, 2021

(65) Prior Publication Data

US 2022/0266692 A1     Aug. 25, 2022

(30) Foreign Application Priority Data

Feb. 24, 2021    (KR) .......................... 10-2021-0024934

(51) Int. Cl.
*B60K 35/00*      (2006.01)
*B60K 23/08*      (2006.01)
(Continued)

(52) U.S. Cl.
CPC .............. *B60K 35/00* (2013.01); *B60K 17/35* (2013.01); *B60K 23/0808* (2013.01); *B60W 30/1846* (2013.01); *B60K 2370/178* (2019.05); *B60K 2370/34* (2019.05); *B60W 2510/104* (2013.01); *B60W 2710/1094* (2013.01)

(58) Field of Classification Search
CPC .... B60K 35/00; B60K 17/35; B60K 23/0808; B60K 2370/178; B60K 2370/34; B60W 30/1846; B60W 2510/104; B60W 2710/1094
See application file for complete search history.

(56) References Cited

U.S. PATENT DOCUMENTS 5,132,908 A * 7/1992 Eto ..................... B60K 23/0808
                                                                 180/197
5,213,177 A * 5/1993 May ........................ B60L 3/102
                                                                 701/84

(Continued)

FOREIGN PATENT DOCUMENTS

CN          106585403 A * 4/2017
CN          107356870 A * 11/2017 ............. G01R 31/34
(Continued)

*Primary Examiner* — Chico A Foxx
(74) *Attorney, Agent, or Firm* — Morgan, Lewis & Bockius LLP

(57) ABSTRACT

An apparatus and method for diagnosing damage to drive-train hardware of a vehicle in which a disconnector may obtain speed of an auxiliary drive wheel motor of the vehicle and speed of a main drive wheel motor of the vehicle and determines damage to the drive-train hardware including the disconnector that controls whether to interrupt delivery of power through engagement or disengagement between auxiliary drive wheel motor-side drive-train hardware and auxiliary drive wheel-side drive-train hardware, based on whether a difference between the speed of the auxiliary drive wheel motor and the speed of the main drive wheel motor exceeds a threshold value, Accordingly, preventing divergence of motor RPM by diagnosing damage to the drive-train hardware of the vehicle.

20 Claims, 7 Drawing Sheets

(51) Int. Cl.
 *B60K 17/35* (2006.01)
 *B60W 30/184* (2012.01)

(56) References Cited

U.S. PATENT DOCUMENTS

| | | | | |
|---|---|---|---|---|
| 5,448,478 A * | 9/1995 | Eto | ................... | B60K 23/0808 |
| | | | | 701/87 |
| 5,752,211 A * | 5/1998 | Takasaki | ............ | B60K 23/0808 |
| | | | | 701/88 |
| 5,758,754 A * | 6/1998 | Yoo | ...................... | B60W 10/18 |
| | | | | 192/101 |
| 7,430,463 B2 * | 9/2008 | Popp | ...................... | F16H 61/12 |
| | | | | 701/33.9 |
| 10,486,668 B2 | 11/2019 | Shah et al. | | |
| 2002/0087239 A1 * | 7/2002 | Kwon | ................... | F16H 59/42 |
| | | | | 701/31.1 |
| 2004/0064233 A1 * | 4/2004 | Iida | ................... | B60K 23/0808 |
| | | | | 701/67 |
| 2005/0187679 A1 * | 8/2005 | Popp | ...................... | F16H 61/12 |
| | | | | 701/33.4 |
| 2006/0241831 A1 * | 10/2006 | Watanabe | ......... | B60W 50/0205 |
| | | | | 701/1 |
| 2009/0251831 A1 * | 10/2009 | Shiba | ...................... | H02H 27/06 |
| | | | | 361/30 |
| 2011/0004383 A1 * | 1/2011 | Seufert | ............... | B60W 50/038 |
| | | | | 701/51 |
| 2012/0309586 A1 * | 12/2012 | Jeong | .................... | B60W 10/08 |
| | | | | 477/3 |
| 2015/0120168 A1 * | 4/2015 | Kono | .................... | B60K 28/10 |
| | | | | 701/102 |
| 2015/0202963 A1 | 7/2015 | Li | | |
| 2017/0076514 A1 * | 3/2017 | Valeri | .................... | G05B 23/00 |
| 2017/0341511 A1 * | 11/2017 | Weidemann | ....... | B60K 23/0808 |
| 2019/0152330 A1 * | 5/2019 | Lee | ....................... | B60L 3/0061 |
| 2020/0031233 A1 * | 1/2020 | Campbell | ............... | B60L 3/003 |
| 2020/0118358 A1 * | 4/2020 | Lee | ........................ | G06N 20/00 |
| 2020/0361465 A1 * | 11/2020 | Kim | ........................ | B60K 23/0808 |
| 2021/0155219 A1 * | 5/2021 | Alcantar | ............... | B60W 10/08 |
| 2021/0226573 A1 * | 7/2021 | George | ............... | B60W 50/023 |

FOREIGN PATENT DOCUMENTS

| | | | | |
|---|---|---|---|---|
| CN | 104828078 B | * | 1/2018 | |
| CN | 108749916 A | * | 11/2018 | ............... B62D 3/02 |
| DE | 102019203725 A1 | * | 9/2020 | |
| EP | 2835707 A1 | * | 2/2015 | ........... G05B 23/024 |
| EP | 3637083 A1 | * | 4/2020 | ........ B60W 50/0205 |
| JP | 4162781 B2 | * | 10/2008 | |
| JP | 2014-075868 A | | 4/2014 | |
| KR | 10-0694617 B | | 3/2007 | |
| KR | 10-1672131 B | | 11/2016 | |
| WO | WO-2016035783 A1 | * | 3/2016 | ............... B62D 5/04 |
| WO | WO-2018173936 A1 | * | 9/2018 | |

* cited by examiner

APPARATUS AND METHOD FOR DIAGNOSING DAMAGE TO DRIVE-TRAIN HARDWARE OF VEHICLE

CROSS-REFERENCE TO RELATED APPLICATION

The present application claims priority to Korean Patent Application No. 10-2021-0024934, filed on Feb. 24, 2021, the entire contents of which is incorporated herein for all purposes by this reference.

BACKGROUND OF THE INVENTION

Field of the Invention

The present invention relates to an apparatus and method for diagnosing damage to drive-train hardware of a vehicle, and more particularly, relates to an apparatus and method for diagnosing damage to drive-train hardware of a vehicle in which a disconnector is included.

Description of Related Art

A four-wheel drive (4WD) electric vehicle may include a motor for front wheels and a motor for rear wheels. One of the front wheels or the rear wheels may be main drive wheels, and the other may be auxiliary drive wheels. A drive system in which the main drive wheels and the auxiliary drive wheels are controlled by the two motors may include a disconnector capable of interrupting delivery of power to the auxiliary drive wheels. An improvement in performance may be achieved by alternately controlling two-wheel drive and four-wheel drive through the disconnector as needed.

At this time, the driving performance of the vehicle may be ensured through cooperative control. In the instant case, separate control of the front wheels and the rear wheels is performed, and therefore when failure diagnosis is not preemptively performed, it may cause greater damage to a drive-train and may be a threat to a user. Accordingly, the importance of technology for diagnosing damage to drive-train hardware of a vehicle in which a disconnector is included is being emphasized, and development of such technology is required.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method for diagnosing damage to drive-train hardware of a vehicle in which a disconnector is included.

Various aspects of the present invention provide a vehicle drive-train hardware damage diagnosis apparatus and method for preventing divergence of motor RPM by diagnosing damage to drive-train hardware of a vehicle.

Various aspects of the present invention provide a vehicle drive-train hardware damage diagnosis apparatus and method for preventing greater shocks or breakdowns and improving the safety of a driver by diagnosing damage to drive-train hardware of an electric vehicle all wheel drive (EV AWD) vehicle or an electric vehicle four wheel drive (EV 4WD) vehicle.

Various aspects of the present invention provide a vehicle drive-train hardware damage diagnosis apparatus and method for minimizing replacement of parts and saving cost by diagnosing damage to drive-train hardware of a vehicle in a controlled way.

Various aspects of the present invention provide a vehicle drive-train hardware damage diagnosis apparatus and method for ensuring robustness of a system of an EV vehicle in which a disconnector is included, by diagnosing damage to drive-train hardware of the vehicle in which the disconnector is included.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various aspects of the present invention, an apparatus of diagnosing damage to drive-train hardware of a vehicle includes a sensor that obtains speed of an auxiliary drive wheel motor of the vehicle and speed of a main drive wheel motor of the vehicle and a controller that determines damage to the drive-train hardware including a disconnector that controls whether to interrupt delivery of power through engagement or disengagement between auxiliary drive wheel motor-side drive-train hardware and auxiliary drive wheel-side drive-train hardware, according to whether a difference between the speed of the auxiliary drive wheel motor and the speed of the main drive wheel motor exceeds a threshold value.

In various exemplary embodiments of the present invention, the sensor may obtain at least one of a position of a sleeve of the disconnector, a position of a fork of the disconnector, or a current of a motor that controls the disconnector, and the controller may be configured to determine a defect in a system that controls the disconnector, based on at least one of the position of the sleeve of the disconnector, the position of the fork of the disconnector, or the current of the motor that controls the disconnector and may determine that the drive-train hardware is not damaged, when it is determined that the system that controls the disconnector is defective.

In various exemplary embodiments of the present invention, the controller may be configured to determine a defect in the system that controls the disconnector, based on whether at least one of the position of the sleeve of the disconnector, the position of the fork of the disconnector, or the current of the motor that controls the disconnector is within a predetermined range, and the specific range may be determined depending on a degree of engagement of the disconnector.

In various exemplary embodiments of the present invention, the controller may be configured to determine damage to at least one of drive-train hardware that delivers power from the auxiliary drive wheel motor to auxiliary drive wheels or drive-train hardware that delivers power from the main drive wheel motor to main drive wheels, by comparing at least one of the speed of the auxiliary drive wheel motor or the speed of the main drive wheel motor with a reference motor speed.

In various exemplary embodiments of the present invention, the reference motor speed may be determined based on at least one of acceleration or wheel speed of the vehicle.

In various exemplary embodiments of the present invention, the controller may be configured to determine damage to at least one of the drive-train hardware that delivers the power from the auxiliary drive wheel motor to the auxiliary drive wheels or the drive-train hardware that delivers the power from the main drive wheel motor to the main drive wheels, by comparing at least one of a value obtained by integrating a change amount in the speed of the auxiliary drive wheel motor or a value obtained by integrating a change amount in the speed of the main drive wheel motor with a value obtained by integrating a change amount in the reference motor speed.

In various exemplary embodiments of the present invention, the controller may be configured to control the disconnector to a state in which power is not delivered to the auxiliary drive wheels, when the controller concludes that the drive-train hardware that delivers the power from the auxiliary drive wheel motor to the auxiliary drive wheels is damaged, and the controller may be configured to control the disconnector to a state in which power is delivered to the auxiliary drive wheels, when the controller concludes that the drive-train hardware that delivers the power from the main drive wheel motor to the main drive wheels is damaged.

In various exemplary embodiments of the present invention, the controller may limit operation of the disconnector, when it is determined that the system that controls the disconnector is defective.

In various exemplary embodiments of the present invention, the controller may limit reflection of torque required by a driver of the vehicle, when the controller concludes that the drive-train hardware is damaged.

In various exemplary embodiments of the present invention, the controller may limit at least one of power or torque of the auxiliary drive wheels, when the controller concludes that the drive-train hardware that delivers the power from the auxiliary drive wheel motor to the auxiliary drive wheels is damaged, and the controller may limit at least one of power or torque of the main drive wheels, when the controller concludes that the drive-train hardware that delivers the power from the main drive wheel motor to the main drive wheels is damaged.

In various exemplary embodiments of the present invention, the controller may inform, through a warning lamp, a user that the vehicle travels using the auxiliary drive wheel motor, when the controller concludes that the drive-train hardware that delivers the power from the main drive wheel motor to the main drive wheels is damaged.

In various exemplary embodiments of the present invention, the controller may be configured to control the disconnector to a state in which power is delivered to auxiliary drive wheels, may apply torque to the auxiliary drive wheel motor, and may determine the damage to the drive-train hardware again, when it is determined that drive-train hardware that delivers power from the auxiliary drive wheel motor to the auxiliary drive wheels is damaged, and the controller may enter a failure mode, when the controller concludes again that the drive-train hardware is damaged.

According to various aspects of the present invention, a method for diagnosing damage to drive-train hardware of a vehicle includes obtaining, by a sensor, speed of an auxiliary drive wheel motor of the vehicle and speed of a main drive wheel motor of the vehicle and determining, by a controller, damage to the drive-train hardware including a disconnector that controls whether to interrupt delivery of power through engagement or disengagement between auxiliary drive wheel motor-side drive-train hardware and auxiliary drive wheel-side drive-train hardware, according to whether a difference between the speed of the auxiliary drive wheel motor and the speed of the main drive wheel motor exceeds a threshold value.

In various exemplary embodiments of the present invention, the method may further include obtaining, by the sensor, at least one of a position of a sleeve of the disconnector, a position of a fork of the disconnector, or a current of a motor that controls the disconnector, determining, by the controller, a defect in a system that controls the disconnector, based on at least one of the position of the sleeve of the disconnector, the position of the fork of the disconnector, or the current of the motor that controls the disconnector, and determining, by the controller, that the drive-train hardware is not damaged, when it is determined that the system that controls the disconnector is defective.

In various exemplary embodiments of the present invention, the determining of the defect in the system that controls the disconnector may include determining, by the controller, the defect in the system that controls the disconnector, based on whether at least one of the position of the sleeve of the disconnector, the position of the fork of the disconnector, or the current of the motor that controls the disconnector is within a predetermined range, and the specific range may be determined depending on a degree of engagement of the disconnector.

In various exemplary embodiments of the present invention, the determining of the damage to the drive-train hardware may include determining, by the controller, damage to at least one of drive-train hardware that delivers power from the auxiliary drive wheel motor to auxiliary drive wheels or drive-train hardware that delivers power from the main drive wheel motor to main drive wheels, by comparing at least one of the speed of the auxiliary drive wheel motor or the speed of the main drive wheel motor with a reference motor speed, and the reference motor speed may be determined based on at least one of acceleration or wheel speed of the vehicle.

In various exemplary embodiments of the present invention, the determining of the damage to at least one of the drive-train hardware that delivers the power from the auxiliary drive wheel motor to the auxiliary drive wheels or the drive-train hardware that delivers the power from the main drive wheel motor to the main drive wheels may include determining, by the controller, the damage to at least one of the drive-train hardware that delivers the power from the auxiliary drive wheel motor to the auxiliary drive wheels or the drive-train hardware that delivers the power from the main drive wheel motor to the main drive wheels, by comparing at least one of a value obtained by integrating a change amount in the speed of the auxiliary drive wheel motor or a value obtained by integrating a change amount in the speed of the main drive wheel motor with a value obtained by integrating a change amount in the reference motor speed.

In various exemplary embodiments of the present invention, the method may further include controlling, by the controller, the disconnector to a state in which power is not delivered to the auxiliary drive wheels, when the controller concludes that the drive-train hardware that delivers the power from the auxiliary drive wheel motor to the auxiliary drive wheels is damaged and controlling, by the controller, the disconnector to a state in which power is delivered to the auxiliary drive wheels, when the controller concludes that the drive-train hardware that delivers the power from the main drive wheel motor to the main drive wheels is damaged.

In various exemplary embodiments of the present invention, the method may further include limiting, by the controller, at least one of power or torque of the auxiliary drive wheels, when the controller concludes that the drive-train hardware that delivers the power from the auxiliary drive wheel motor to the auxiliary drive wheels is damaged and limiting, by the controller, at least one of power or torque of the main drive wheels, when the controller concludes that the drive-train hardware that delivers the power from the main drive wheel motor to the main drive wheels is damaged.

In various exemplary embodiments of the present invention, the method may further include informing, by the controller through a warning lamp, a user that the vehicle travels using the auxiliary drive wheel motor, when the controller concludes that the drive-train hardware that delivers the power from the main drive wheel motor to the main drive wheels is damaged.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
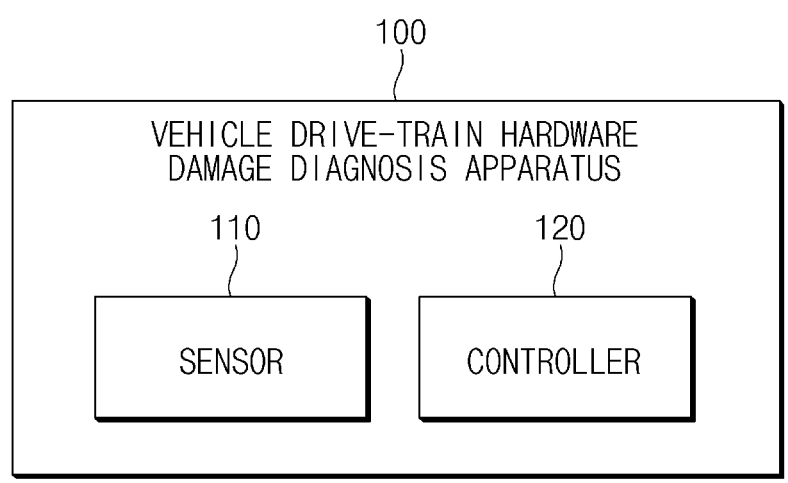
FIG. 1 is a block diagram illustrating a vehicle drive-train hardware damage diagnosis apparatus according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIGS. 1 to 7.

FIG. 1 is a block diagram illustrating a vehicle drive-train hardware damage diagnosis apparatus according to various exemplary embodiments of the present invention.

Referring to FIG. 1, the vehicle drive-train hardware damage diagnosis apparatus 100 may include a sensor 110 and a controller 120.

The vehicle drive-train hardware damage diagnosis apparatus 100 according to various exemplary embodiments of the present invention may be implemented inside or outside a vehicle. The vehicle drive-train hardware damage diagnosis apparatus 100 may be integrally formed with control units inside the vehicle, or may be implemented as a separate hardware apparatus and may be connected to the control units of the vehicle by connecting means.

For example, the vehicle drive-train hardware damage diagnosis apparatus 100 may be integrated with the vehicle, may be implemented in a form which is installed on/attached to the vehicle as a component separate from the vehicle, or may be implemented in a form in which a part is integrated with the vehicle and another part is installed on/attached to the vehicle as a component separate from the vehicle.

The sensor 110 may obtain the speed of an auxiliary drive wheel motor and the speed of a main drive wheel motor of the vehicle.

The sensor 110 may obtain at least one of the position of a sleeve of a disconnector, the position of a fork of the disconnector, or a current of a motor that controls the disconnector.

For example, the sensor 110 may include a wheel speed sensor, a position sensor, a current sensor, or the like.

In another example, the sensor 110 may be connected to a motor system or a disconnector assist system (DAS) of the vehicle and may receive, from the motor system or the DAS of the vehicle, information related to at least one of the speed of the auxiliary drive wheel motor of the vehicle, the speed of the main drive wheel motor of the vehicle, the position of the sleeve of the disconnector, the position of the fork of the disconnector, or the current of the motor controlling the disconnector.

Furthermore, the sensor 110 may be connected to the controller 120 through wireless or wired communication and may directly or indirectly transmit, to the controller 120, the information related to at least one of the speed of the auxiliary drive wheel motor of the vehicle, the speed of the main drive wheel motor of the vehicle, the position of the sleeve of the disconnector, the position of the fork of the disconnector, or the current of the motor controlling the disconnector.

The controller 120 may perform overall control to enable components to normally perform functions thereof. The controller 120 may be implemented in a form of hardware or software, or in a combination thereof. The controller 120 may preferably be implemented with, but is not limited to, a microprocessor. Furthermore, the controller 120 may perform various data processing or computation that will be described below.

The controller 120 may determine damage to drive-train hardware including the disconnector that controls whether to interrupt delivery of power through engagement or disengagement between auxiliary drive wheel motor-side drive-train hardware and auxiliary drive wheel-side drive-train hardware, based on whether the difference between the speed of the auxiliary drive wheel motor and the speed of the main drive wheel motor exceeds a threshold value.

The disconnector may control whether to interrupt delivery of power through engagement or disengagement between auxiliary drive wheel motor-side drive-train and auxiliary drive wheel-side drive-train hardware of an electric vehicle all wheel drive (EV AWD) vehicle.

A specific structure of the disconnector will be described below with reference to FIG. 3.

In the state in which the disconnector is engaged, the wheel speed of front wheels and the wheel speed of rear wheels have to be equal to each other, and therefore the motor speeds may also have to be equal to each other. However, the degrees of slip may slightly differ from each other depending on torque levels, and therefore the controller 120 may determine damage to the drive-train hardware, based on whether the difference between the speed of the auxiliary drive wheel motor and the speed of the main drive wheel motor exceeds the preset threshold value, rather than whether the difference between the speed of the auxiliary drive wheel motor and the speed of the main drive wheel motor exceeds 0.

When the drive-train hardware of the vehicle is damaged so that there is a problem in power delivery, loads by friction of the wheels may decrease or disappear, and therefore the speed of the main drive wheel motor or the auxiliary drive wheel motor, the drive-train hardware of which is damaged, may diverge. Accordingly, the controller 120 may determine the damage to the drive-train hardware through the difference between the speed of the auxiliary drive wheel motor and the speed of the main drive wheel motor.

For example, the vehicle drive-train hardware damage diagnosis apparatus 100 may determine the damage to the drive-train hardware by comparing an integrated motor torque and an integrated difference between the speed of the main drive wheel motor and the speed of the auxiliary drive wheel motor.

The controller 120 may determine a defect in a system controlling the disconnector, based on at least one of the position of the sleeve of the disconnector, the position of the fork of the disconnector, or the current of the motor controlling the disconnector, and when it is determined that the system controlling the disconnector is defective, the controller 120 may determine that the drive-train hardware is not damaged.

For example, the controller 120 may distinguish between a defect in the DAS and damage to the drive-train hardware and may take different actions for the respective cases. Accordingly, the controller 120 may determine a defect in the DAS, based on at least one of the position of the sleeve of the disconnector, the position of the fork of the disconnector, or the current of the motor controlling the disconnector.

The controller 120 may determine a defect in the system controlling the disconnector, based on whether at least one of the position of the sleeve of the disconnector, the position of the fork of the disconnector, or the current of the motor controlling the disconnector is within a specific range. Here, the specific range may be determined depending on a degree of engagement of the disconnector.

For example, the position of the sleeve or the position of the fork may be adjusted by the motor controlling the disconnector.

For example, the disconnector may adjust the degree of engagement between the auxiliary drive wheel motor-side drive-train hardware and the auxiliary drive wheel-side drive-train hardware depending on the position of the sleeve or the position of the fork. A specific description thereabout will be provided below with reference to FIG. 3.

For example, the range of the position of the sleeve or the fork which is determined to be normal may be determined depending on the degree of engagement of the disconnector.

Furthermore, the range of the current of the motor controlling the disconnector which is determined to be normal may be determined depending on the degree of engagement of the disconnector.

The relationship between the position of the sleeve or the fork and the degree of engagement of the disconnector will be described below with reference to FIG. 4.

For example, the controller 120 may determine damage to at least one of drive-train hardware delivering power from the auxiliary drive wheel motor to auxiliary drive wheels or drive-train hardware delivering power from the main drive wheel motor to main drive wheels, by comparing at least one of the speed of the auxiliary drive wheel motor or the speed of the main drive wheel motor with a reference motor speed.

For example, to determine the final damage to the drive-train hardware, the controller 120 may compare the motor speeds obtained through the sensor 110 and the reference motor speed (model speed).

Here, the reference motor speed may be determined based on at least one of the acceleration or the wheel speed of the vehicle.

For example, the reference motor speed may be determined based on at least one of the acceleration or the wheel speed of the vehicle determined by at least one of motor torques or motor speeds.

When the drive-train hardware is damaged so that there is a problem in power delivery, loads by friction of the wheels may decrease or disappear, and therefore the motor speeds may diverge and may exceed the reference motor speed.

Accordingly, the controller 120 may compare the motor speeds obtained through the sensor 110 and the reference motor speed (model speed) to determine the damage to the drive-train hardware and determine whether the drive-train hardware delivering power to the main drive wheels or the drive-train hardware delivering power to the auxiliary drive wheels is damaged.

The controller 120 may determine damage to at least one of the drive-train hardware delivering power from the auxiliary drive wheel motor to the auxiliary drive wheels or the drive-train hardware delivering power from the main drive wheel motor to the main drive wheels, by comparing at least one of a value obtained by integrating the change amount in the speed of the auxiliary drive wheel motor or a value obtained by integrating the change amount in the speed of the main drive wheel motor with a value obtained by integrating the change amount in the reference motor speed.

For example, to prevent misdiagnosis of damage to the drive-train hardware due to an instantaneous error value, the controller 120 may determine the damage to the drive-train hardware by comparing at least one of the value obtained by integrating the change amount in the speed of the auxiliary drive wheel motor or the value obtained by integrating the change amount in the speed of the main drive wheel motor with the value obtained by integrating the change amount in the reference motor speed.

When it is determined that the drive-train hardware delivering power from the auxiliary drive wheel motor to the auxiliary drive wheels is damaged, the controller 120 may control the disconnector to a state in which power is not delivered to the auxiliary drive wheels, and when it is determined that the drive-train hardware delivering power from the main drive wheel motor to the main drive wheels is damaged, the controller 120 may control the disconnector to a state in which power is delivered to the auxiliary drive wheels.

For example, when it is determined that the drive-train hardware delivering power from the auxiliary drive wheel motor to the auxiliary drive wheels is damaged, the controller 120 may control the disconnector to a disengagement state in which power is not delivered to the auxiliary drive wheels.

Accordingly, power may be delivered from the main drive wheel motor to the main drive wheels, and the vehicle may travel in a two-wheel drive (2WD) state and may safely travel even in the state in which the auxiliary drive wheel-side drive-train hardware is damaged.

For example, when it is determined that the drive-train hardware delivering power from the main drive wheel motor to the main drive wheels is damaged, the controller 120 may control the disconnector to an engagement state in which power is delivered to the auxiliary drive wheels.

Accordingly, power may be delivered from the auxiliary drive wheel motor to the auxiliary drive wheels, and the vehicle may safely travel even in the state in which the main drive wheel-side drive-train hardware is damaged.

When it is determined that the system controlling the disconnector is defective, the controller 120 may limit operation of the disconnector.

For example, when it is determined that the system controlling the disconnector is defective, the controller 120 may prevent an accident caused by operation of the defective disconnector by limiting the operation of the disconnector.

When it is determined that the drive-train hardware is damaged, the controller 120 may limit reflection of torque required by a driver of the vehicle.

When the drive-train hardware is damaged, power or torque smaller than that in a normal state may be reflected according to various exemplary embodiments of the present invention implementing a system that drives the vehicle by delivering power through the main drive wheel motor or the auxiliary drive wheel motor of which the drive-train hardware is not damaged.

Accordingly, when it is determined that the drive-train hardware is damaged, the controller 120 may perform control to limit reflection of the torque required by the driver of the vehicle and drive the vehicle by delivering power through the main drive wheel motor or the auxiliary drive wheel motor of which the drive-train hardware is not damaged.

When it is determined that the drive-train hardware delivering power from the auxiliary drive wheel motor to the auxiliary drive wheels is damaged, the controller 120 may limit at least one of the power or the torque of the auxiliary drive wheels, and when it is determined that the drive-train hardware delivering power from the main drive wheel motor to the main drive wheels is damaged, the controller 120 may limit at least one of the power or the torque of the main drive wheels.

When the drive-train hardware is damaged, power may not be delivered from the motors to the wheels. Accordingly, loads by friction of the wheels may decrease or disappear, and in the instant case, the speeds of the motors may diverge to cause a big breakdown or accident.

Furthermore, when the drive-train hardware is damaged, the system may recognize a wheel spin situation at a high friction-side wheel on the opposite side, and a brake controller may malfunction, which may lead to a big accident. At the instant time, physical impact may be applied to other parts by strong impact, and power electronic parts may be defective due to divergence of the motors.

Accordingly, the controller 120 may prevent a big breakdown or accident caused by divergence of the motor speeds by limiting at least one of the power or torque of a drive wheel-side motor corresponding to drive-train hardware diagnosed to be damaged.

When it is determined that the drive-train hardware delivering power from the main drive wheel motor to the main drive wheels is damaged, the controller 120 may inform, through a warning lamp, a user that the vehicle travels using the auxiliary drive wheel motor.

For example, through a warning lamp displayed on a cluster, a head-up display (HUD), or an audio video navigation (AVN) system of the vehicle, the controller 120 may inform the user that the vehicle travels using the auxiliary drive wheel motor.

For example, the displayed warning lamp may include a warning lamp having a symbol configured for intuitively informing the user that there is a problem with the auxiliary drive wheels or the drive-train hardware.

When it is determined that the drive-train hardware delivering power from the auxiliary drive wheel motor to the auxiliary drive wheels is damaged, the controller 120 may control the disconnector to a state in which power is delivered to the auxiliary drive wheels, may determine the damage to the drive-train hardware again by applying torque to the auxiliary drive wheel motor, and may enter a failure mode when the controller concludes again that the drive-train hardware is damaged.

For example, through engagement of the disconnector, the controller 120 may try to control the disconnector to a state in which power is delivered to the auxiliary drive wheels. Thereafter, the controller 120 may determine whether the speed of the auxiliary drive wheel motor diverges, by applying weak torque to the auxiliary drive wheel motor. Accordingly, the controller 120 may determine damage to the auxiliary drive wheel-side drive-train hardware again, and when it is determined again that the auxiliary drive wheel-side drive-train hardware is damaged, the controller 120 may enter the failure mode and may control the drive-train.

The reason why the weak torque is applied to the auxiliary drive wheel motor is because the speed of the motor diverges to cause a big accident or breakdown if the drive-train hardware is damaged in the case where strong torque is applied to the auxiliary drive wheel motor.

For example, the failure mode may include a limp home mode for providing operation of limited output power.

Figure 2:
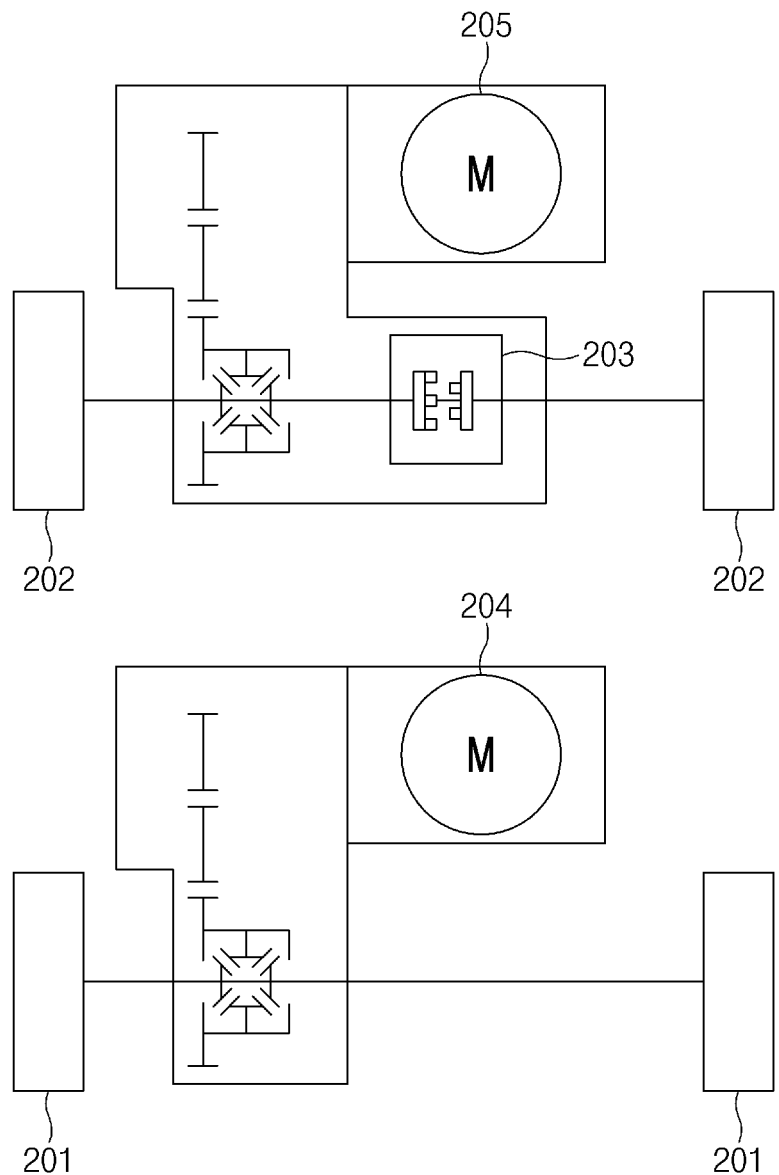
FIG. 2 is a block diagram illustrating a drive-train of an electric vehicle all wheel drive (EV AWD) vehicle according to various exemplary embodiments of the present invention.

FIG. 2 is a block diagram illustrating a drive-train of an electric vehicle all wheel drive (EV AWD) vehicle according to various exemplary embodiments of the present invention.

Referring to FIG. 2, the drive-train of the EV AWD vehicle according to the exemplary embodiment of the present invention may include main drive wheels 201, auxiliary drive wheels 202, a disconnector 203, a main drive wheel motor 204, and an auxiliary drive wheel motor 205.

For example, the main drive wheels 201 and the auxiliary drive wheels 202 may be front wheels and rear wheels, respectively, or vice versa.

The disconnector 203 may be engaged or disengaged to connect or disconnect auxiliary drive wheel-side hardware and auxiliary drive wheel motor-side hardware.

When the disconnector 203 is engaged, the auxiliary drive wheel motor 205 and the auxiliary drive wheels 202 may be mechanically connected to each other so that power, or a load caused by friction may be delivered therebetween, and when the disconnector 203 is disengaged, the auxiliary drive wheel motor 205 and the auxiliary drive wheels 202 may be mechanically disconnected from each other so that power, or a load caused by friction may not be delivered therebetween.

The EV AWD vehicle may travel in a two-wheel drive (2WD) mode or a four-wheel drive (4WD) mode depending on engagement or disengagement of the disconnector 203 and may improve the fuel economy of the vehicle through a disconnector system, or may supplement power or torque through the auxiliary drive wheel motor 205 as needed.

A structure of the disconnector 203 will be described below in detail with reference to FIG. 3.

Figure 3:
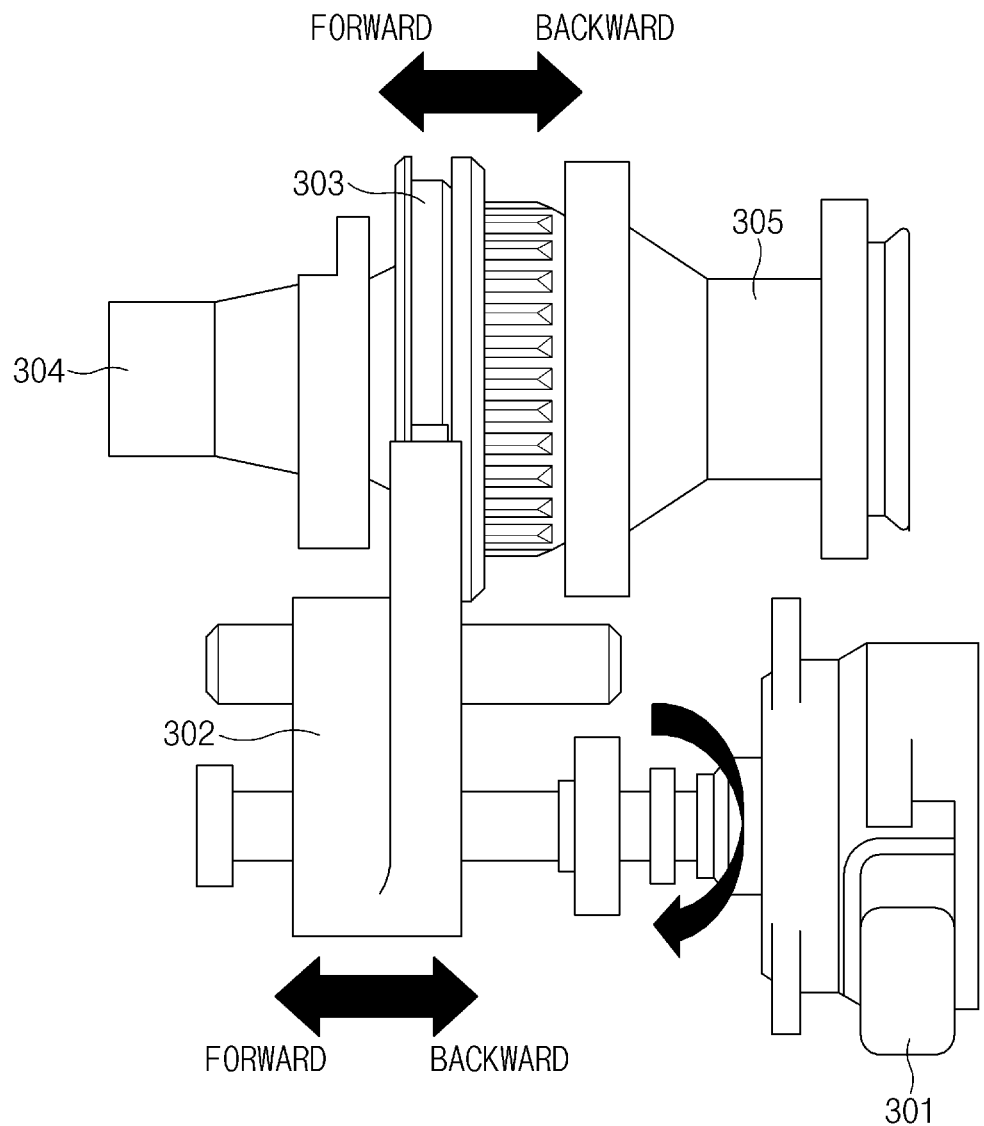
FIG. 3 is a view exemplarily illustrating a disconnector according to various exemplary embodiments of the present invention.

FIG. 3 is a view exemplarily illustrating the disconnector according to various exemplary embodiments of the present invention.

Referring to FIG. 3, the disconnector 203 according to the exemplary embodiment of the present invention may include a DAS control motor 301, a fork 302, a sleeve 303, a shaft 304, and a hub 305.

The DAS control motor 301 may control the position of the fork 302 through adjustment of a current flowing in the DAS control motor 301 such that the fork 302 moves forward or backward thereof.

The fork 302 may be mechanically connected to the sleeve 303, and when the fork 302 moves forward or backward, the sleeve 303 may also move forward or backward thereof.

Through the forward or backward movement of the sleeve 303, the shaft 304 and the hub 305 may be engaged with, or disengaged from, each other. When the shaft 304 and the hub 305 are engaged with each other, the disconnector 203 may be in a connected state in which power is delivered between the auxiliary drive wheel motor 205 and the auxiliary drive wheels 202, and when the shaft 304 and the hub 305 are disengaged from each other, the disconnector 203 may be in a disconnected state in which power is not delivered between the auxiliary drive wheel motor 205 and the auxiliary drive wheels 202

A DAS stroke may be defined as the position of the sleeve 303 of the disconnector 203 or the position of the fork 302 of the disconnector 203.

Figure 4:
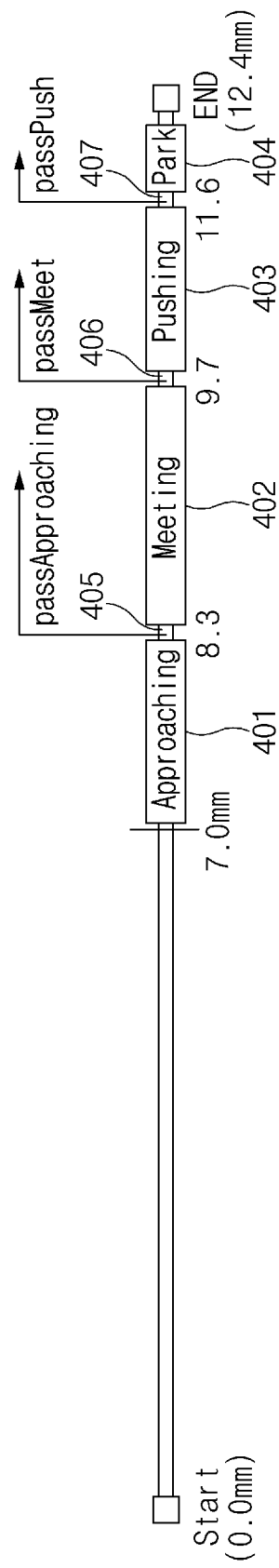
FIG. 4 is a view exemplarily illustrating a degree of engagement of the disconnector according to various exemplary embodiments of the present invention.

FIG. 4 is a view exemplarily illustrating a degree of engagement of the disconnector according to various exemplary embodiments of the present invention.

Referring to FIG. 4, an engagement state of the disconnector 203 may be determined depending on the DAS stroke (the position of the sleeve 303 or the fork 302 of the disconnector 203) in the direction in which the disconnector 203 is engaged or disengaged with respect to a specific position.

For example, when the DAS stroke ranges from 7.0 mm to 8.3 mm with respect to the specific position, the engagement state of the disconnector 203 may be determined to be an "Approaching state" 401.

For example, when the DAS stroke ranges from 8.3 mm to 9.7 mm with respect to the specific position, the engagement state of the disconnector 203 may be determined to be a "Meeting state" 402.

For example, when the DAS stroke ranges from 9.7 mm to 11.6 mm with respect to the specific position, the engagement state of the disconnector 203 may be determined to be a "Pushing state" 403.

For example, when the DAS stroke ranges from 11.6 mm to 12.4 mm with respect to the specific position, the engagement state of the disconnector 203 may be determined to be a "Park state" 404.

Here, the boundary values of the engagement states of the disconnector 203 are provided for illustration and may actually be determined to be different values.

Furthermore, a "passAproaching state" 405, a "passMeeting state" 406, and a "passPush state" 407 for determination of a change of the engagement state of the disconnector 203, which varies depending on the DAS stroke, may exist.

Whether the engagement state of the disconnector 203 is the "passAproaching state" 405, the "passMeeting state" 406, or the "passPush state" 407 may be determined depending on whether the DAS stroke is within a specific range based on the boundary value 8.3 mm, 9.7 mm, or 11.6 mm. The specific range based on the boundary value may have a smaller value than a specific range corresponding to the "Approaching state" 401, the "Meeting state" 402, the "Pushing state" 403, or the "Park state" 404.

The position of the sleeve 303 or the fork 302 of the disconnector 203 which is determined to be a normal range, and a current range of a motor that controls the disconnector 203 may be determined depending on the engagement states of the disconnector 203 that correspond to the "Approaching state" 401, the "Meeting state" 402, the "Pushing state" 403, the "Park state" 404, the "passApproaching state" 405, the "passMeeting state" 406, and the "passPush state" 407.

Because the required speeds of the motor and the loads (physical resistances) applied to the motor differ from one another depending on the states, the position of the sleeve 303 or the fork 302 of the disconnector 203 which is determined to be a normal range, and the current range of the motor that controls the disconnector 203 may be differently determined.

For example, when the current of the motor that controls the disconnector 203 ranges from 5 A to 15 A in the "Meeting state" 402, the vehicle drive-train hardware damage diagnosis apparatus 100 may determine a normal state in which the DAS has no defect.

Here, the numerical range of 5 A to 15 A is an arbitrarily set range for illustration and may actually be set to a different range.

Figure 5:
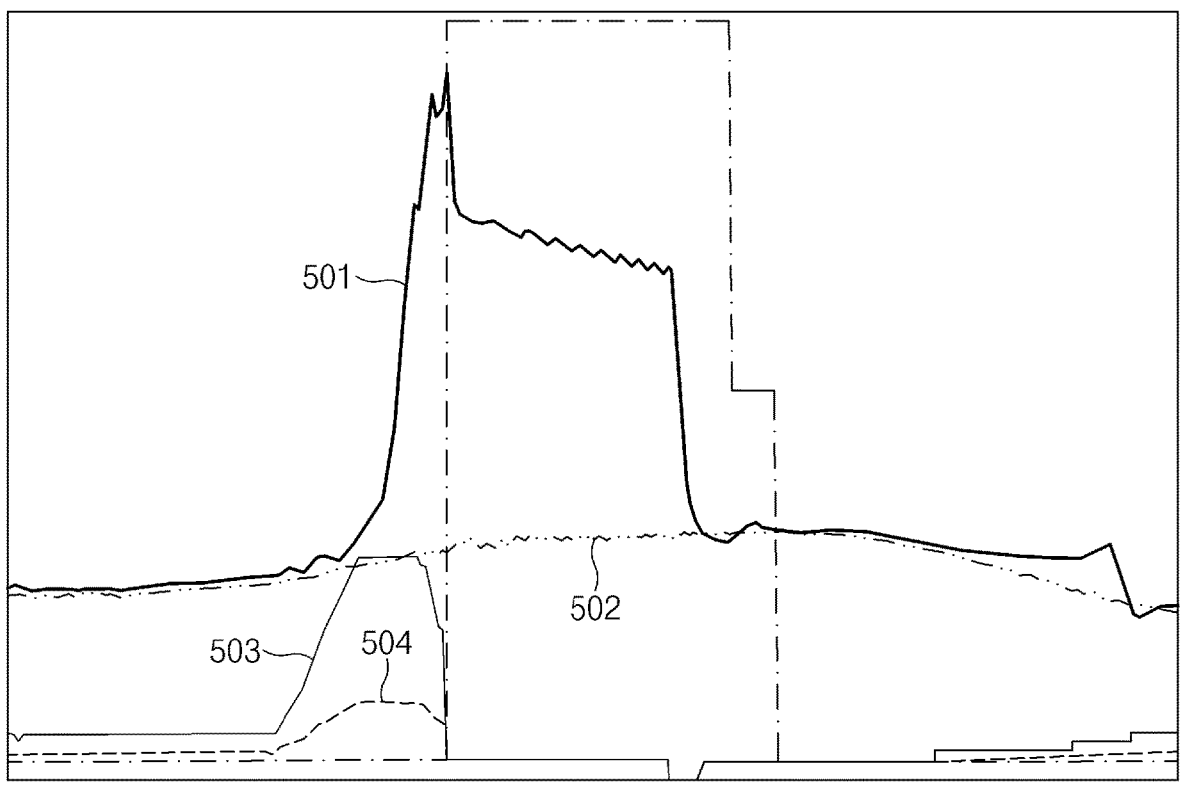
FIG. 5 is a graph depicting motor speeds and motor torques according to various exemplary embodiments of the present invention.

FIG. 5 is a graph depicting motor speeds and motor torques according to various exemplary embodiments of the present invention.

The graph of FIG. 5 represents front wheel motor speed 501, rear wheel motor speed 502, front wheel motor torque 503 determined based on an amount of change in the front wheel motor speed, and actually-measured front wheel motor torque 504 over time.

When a driving mode transitions from a 2WD mode to a 4WD mode due to control of the disconnector system, the front wheel motor speed and the rear wheel motor speed have to be equal to each other in a normal situation in which drive-train hardware is not damaged.

However, when the drive-train hardware is damaged, a front wheel motor or a rear wheel motor of which the drive-train hardware is damaged does not receive loads by friction of wheels, and therefore the motor speed may diverge.

Because there is a large difference between the front wheel motor speed 501 and the rear wheel motor speed 502, the vehicle drive-train hardware damage diagnosis apparatus 100 may determine that the front wheel-side drive-train hardware is damaged.

Furthermore, the front wheel motor torque 503 determined based on an amount of change in the front wheel motor speed in the normal situation in which the drive-train hardware is not damaged and the actually-measured front wheel motor torque 504 may be equal to each other, or may differ from each other within an allowable error range.

However, when the front wheel-side drive-train hardware is damaged, the front wheel-side motor does not receive loads by friction of the wheels, and therefore the front wheel motor torque 503 determined based on an amount of change in the front wheel motor speed may be greater than the actually-measured front wheel motor torque 504. Accordingly, the vehicle drive-train hardware damage diagnosis apparatus 100 may determine that the front wheel-side drive-train hardware is damaged.

Figure 6:
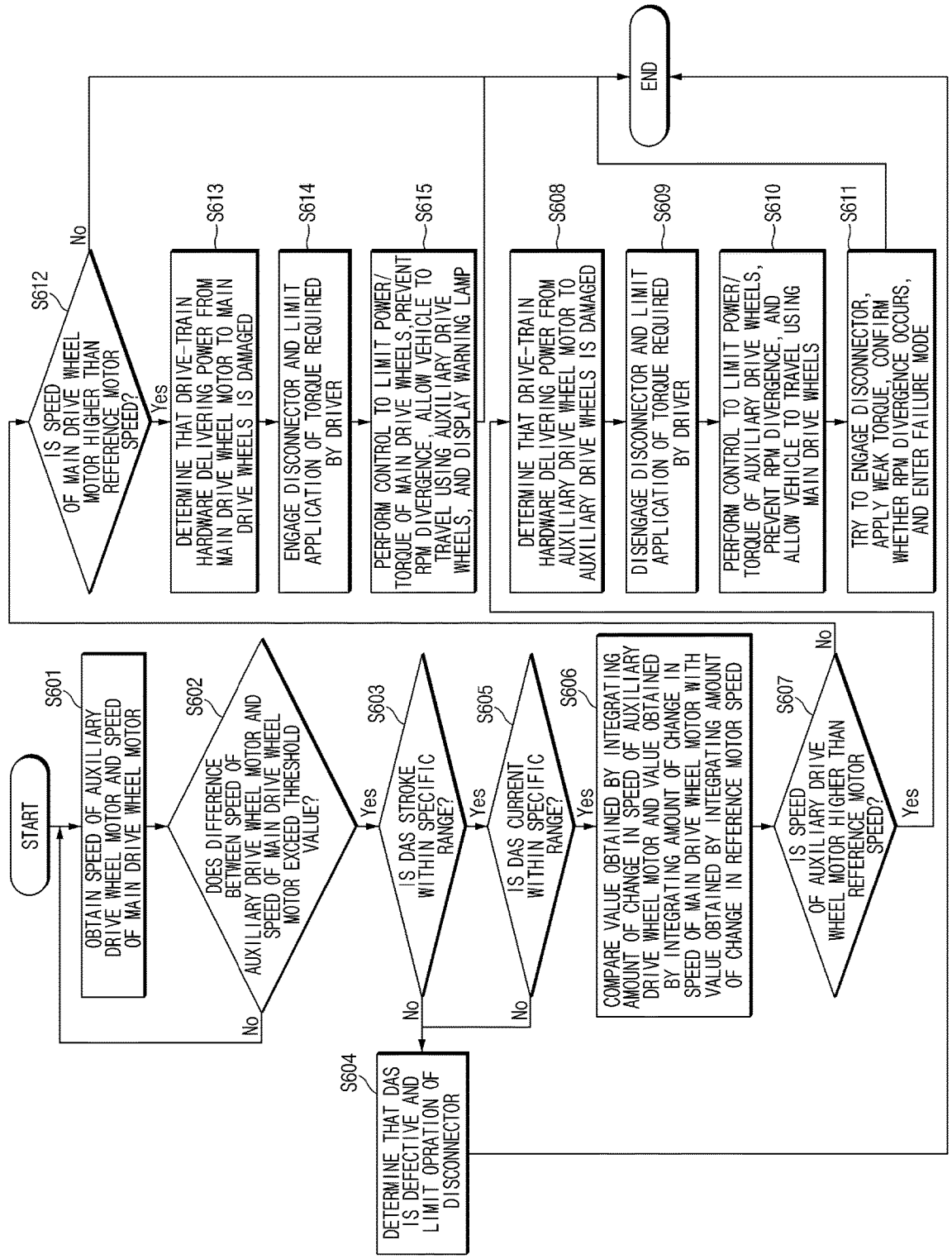
FIG. 6 is a flowchart illustrating a process of diagnosing damage to drive-train hardware by the vehicle drive-train hardware damage diagnosis apparatus according to various exemplary embodiments of the present invention.

FIG. 6 is a flowchart illustrating a process of diagnosing damage to drive-train hardware by the vehicle drive-train hardware damage diagnosis apparatus according to various exemplary embodiments of the present invention.

Referring to FIG. 6, the vehicle drive-train hardware damage diagnosis apparatus 100 may obtain the speed of an auxiliary drive wheel motor and the speed of a main drive wheel motor (S601).

For example, the vehicle drive-train hardware damage diagnosis apparatus 100 may obtain the speed of the auxiliary drive wheel motor and the speed of the main drive wheel motor through a wheel speed sensor.

After obtaining the speed of the auxiliary drive wheel motor and the speed of the main drive wheel motor (S601), the vehicle drive-train hardware damage diagnosis apparatus 100 may determine whether the difference between the speed of the auxiliary drive wheel motor and the speed of the main drive wheel motor exceeds a threshold value (S602).

For example, the threshold value may be a value set in proportion to the difference in torque between the auxiliary drive wheel motor and the main drive wheel motor.

After determining whether the difference between the speed of the auxiliary drive wheel motor and the speed of the main drive wheel motor exceeds the threshold value (S602), the vehicle drive-train hardware damage diagnosis apparatus 100 may perform process S601 again when it is determined that the difference between the speed of the auxiliary drive wheel motor and the speed of the main drive wheel motor does not exceed the threshold value.

For example, when it is determined that the difference between the speed of the auxiliary drive wheel motor and the speed of the main drive wheel motor does not exceed the threshold value, the vehicle drive-train hardware damage diagnosis apparatus 100 may determine that the drive-train hardware is not damaged and may perform process S601 again.

After determining whether the difference between the speed of the auxiliary drive wheel motor and the speed of the main drive wheel motor exceeds the threshold value (S602), the vehicle drive-train hardware damage diagnosis apparatus 100 may determine whether a DAS stroke is within a specific range (S603), when it is determined that the difference between the speed of the auxiliary drive wheel motor and the speed of the main drive wheel motor exceeds the threshold value.

The DAS stroke may be defined as the position of a sleeve of a disconnector or the position of a fork of the disconnector.

For example, when it is determined that the difference between the speed of the auxiliary drive wheel motor and the speed of the main drive wheel motor exceeds the threshold value, the vehicle drive-train hardware damage diagnosis apparatus 100 may diagnose a defect in a DAS, and to distinguish the defect in the DAS from damage to drive-train hardware, may determine whether the DAS stroke is within the specific range.

For example, the specific range for determining a normal range of the DAS stroke may be determined depending on the degree of engagement of the disconnector.

After determining whether the DAS stroke is within the specific range (S603), the vehicle drive-train hardware damage diagnosis apparatus 100 may determine that the DAS is defective and may limit operation of the disconnector (S604), when it is determined that the DAS stroke is not within the specific range.

For example, when it is determined that the DAS stroke is not within the specific range, the vehicle drive-train hardware damage diagnosis apparatus 100 may determine that the DAS is defective and may take action different from that when the drive-train hardware is damaged.

For example, when it is determined that the DAS is defective, the vehicle drive-train hardware damage diagnosis apparatus 100 may determine that other drive-train hardware, such as a driveshaft, a bearing, or a join, is not damaged.

For example, when it is determined that the DAS is defective, the vehicle drive-train hardware damage diagnosis apparatus 100 may limit operation of the disconnector, preventing accidents or other failures due to operation of the defective disconnector.

After determining whether the DAS stroke is within the specific range (S603), the vehicle drive-train hardware damage diagnosis apparatus 100 may determine whether a DAS current is within a specific range (S605), when it is determined that the DAS stroke is within the specific range.

For example, the specific range for determining a normal range of the DAS current may be determined depending on the degree of engagement of the disconnector.

After determining whether the DAS current is within the specific range (S605), the vehicle drive-train hardware damage diagnosis apparatus 100 may determine that the DAS is defective and may limit operation of the disconnector (S604), when it is determined that the DAS current is not within the specific range.

For example, when it is determined that the DAS current is not within the specific range, the vehicle drive-train hardware damage diagnosis apparatus 100 may determine that the DAS is defective and may take action different from that when the drive-train hardware is damaged.

After determining whether the DAS current is within the specific range (S605), the vehicle drive-train hardware damage diagnosis apparatus 100 may compare a value obtained by integrating the change amount in the speed of the auxiliary drive wheel motor and a value obtained by integrating the change amount in the speed of the main drive wheel motor with a value obtained by integrating the amount of change in a reference motor speed (S606), when it is determined that the DAS current is within the specific range.

For example, to prevent misdiagnosis of damage to the drive-train hardware due to an instantaneous error value, the vehicle drive-train hardware damage diagnosis apparatus 100 may determine the damage to the drive-train hardware by comparing the value obtained by integrating the change amount in the reference motor speed with the value obtained by integrating the change amount in the speed of the auxiliary drive wheel motor or the value obtained by integrating the change amount in the speed of the main drive wheel motor.

After comparing the value obtained by integrating the change amount in the speed of the auxiliary drive wheel motor and the value obtained by integrating the change amount in the speed of the main drive wheel motor with the value obtained by integrating the change amount in the reference motor speed (S606), the vehicle drive-train hardware damage diagnosis apparatus 100 may determine whether the speed of the auxiliary drive wheel motor is higher than the reference motor speed (S607).

For example, the vehicle drive-train hardware damage diagnosis apparatus 100 may determine whether the speed of the auxiliary drive wheel motor is higher than the reference motor speed, by determining whether the value obtained by integrating the change amount in the speed of the auxiliary drive wheel motor is greater than the value obtained by integrating the change amount in the reference motor speed.

After determining whether the speed of the auxiliary drive wheel motor is higher than the reference motor speed (S607), the vehicle drive-train hardware damage diagnosis apparatus 100 may determine that drive-train hardware delivering power from the auxiliary drive wheel motor to auxiliary drive wheels is damaged (S608), when it is determined that the speed of the auxiliary drive wheel motor is higher than the reference motor speed.

For example, when it is determined that the speed of the auxiliary drive wheel motor is higher than the reference motor speed, the vehicle drive-train hardware damage diagnosis apparatus 100 may determine that no load is applied to the auxiliary drive wheel motor so that the motor speed diverges and the drive-train hardware delivering power from the auxiliary drive wheel motor to the auxiliary drive wheels is damaged.

After determining that the drive-train hardware delivering power from the auxiliary drive wheel motor to the auxiliary drive wheels is damaged (S608), the vehicle drive-train hardware damage diagnosis apparatus 100 may disengage the disconnector and may limit reflection of torque required by a driver (S609).

For example, the vehicle drive-train hardware damage diagnosis apparatus 100 may disengage the disconnector to interrupt delivery of power from the auxiliary drive wheel motor to the auxiliary drive wheels, facilitating the vehicle to be driven by only the main drive wheel motor.

For example, the vehicle drive-train hardware damage diagnosis apparatus 100 may limit the reflection of the torque required by the driver to a torque range implemented by only the main drive wheel motor.

After disengaging the disconnector and limiting the reflection of the torque required by the driver (S609), the vehicle drive-train hardware damage diagnosis apparatus 100 may perform control to limit the power or torque of the auxiliary drive wheels, prevent RPM divergence of the auxiliary drive wheels, and allow the vehicle to travel using main drive wheels (S610).

For example, the vehicle drive-train hardware damage diagnosis apparatus 100 may prevent the RPM divergence of the auxiliary drive wheels by limiting the power or torque of the auxiliary drive wheels.

For example, the vehicle drive-train hardware damage diagnosis apparatus 100 may perform control to allow the vehicle to travel using the main drive wheels, by disengaging the disconnector.

After performing control to limit the power or torque of the auxiliary drive wheels, prevent the RPM divergence of the auxiliary drive wheels, and allow the vehicle to travel using the main drive wheels (S610), the vehicle drive-train hardware damage diagnosis apparatus 100 may try to engage the disconnector, may apply weak torque, may confirm whether RPM divergence occurs, and may enter a failure mode (S611).

For example, to determine the damage to the drive-train hardware again before entrance to the failure mode, the vehicle drive-train hardware damage diagnosis apparatus 100 may try to engage the disconnector, may apply the weak torque, and may confirm whether the RPM divergence of the auxiliary drive wheel motor occurs. When the drive-train is damaged, no load is still applied to the motor, and therefore the RPM of the auxiliary drive wheel motor may diverge.

After determining whether the speed of the auxiliary drive wheel motor is higher than the reference motor speed (S607), the vehicle drive-train hardware damage diagnosis apparatus 100 may determine whether the speed of the main drive wheel motor is higher than the reference motor speed (S612), when it is determined that the speed of the auxiliary drive wheel motor is not higher than the reference motor speed.

For example, the vehicle drive-train hardware damage diagnosis apparatus 100 may determine whether the speed of the main drive wheel motor is higher than the reference motor speed, by determining whether the value obtained by integrating the change amount in the speed of the main drive wheel motor is greater than the value obtained by integrating the change amount in the reference motor speed.

After determining whether the speed of the main drive wheel motor is higher than the reference motor speed (S612), the vehicle drive-train hardware damage diagnosis apparatus 100 may determine that drive-train hardware delivering power from the main drive wheel motor to the main drive wheels is damaged (S613), when it is determined that the speed of the main drive wheel motor is higher than the reference motor speed.

For example, when it is determined that the speed of the main drive wheel motor is higher than the reference motor speed, the vehicle drive-train hardware damage diagnosis apparatus 100 may determine that no load is applied to the main drive wheel motor so that the motor speed diverges and the drive-train hardware delivering power from the main drive wheel motor to the main drive wheels is damaged.

After determining that the drive-train hardware delivering power from the main drive wheel motor to the main drive wheels is damaged (S613), the vehicle drive-train hardware damage diagnosis apparatus 100 may engage the disconnector and may limit reflection of torque required by the driver (S614).

For example, the vehicle drive-train hardware damage diagnosis apparatus 100 may engage the disconnector to deliver power from the auxiliary drive wheel motor to the auxiliary drive wheels, facilitating the vehicle to be driven by only the auxiliary drive wheel motor.

For example, the vehicle drive-train hardware damage diagnosis apparatus 100 may limit the reflection of the torque required by the driver to a torque range implemented by only the auxiliary drive wheel motor.

After engaging the disconnector and limiting the reflection of the torque required by the driver (S614), the vehicle drive-train hardware damage diagnosis apparatus 100 may perform control to limit the power or torque of the main drive wheels, prevent RPM divergence of the main drive wheels, allow the vehicle to travel using the auxiliary drive wheels, and display a warning lamp (S615).

For example, the vehicle drive-train hardware damage diagnosis apparatus 100 may prevent the RPM divergence of the main drive wheels by limiting the power or torque of the main drive wheels.

For example, the vehicle drive-train hardware damage diagnosis apparatus 100 may perform control to allow the vehicle to travel using the auxiliary drive wheels, by engaging the disconnector.

For example, through a warning lamp displayed on a cluster, an HUD, or an AVN system of the vehicle, the vehicle drive-train hardware damage diagnosis apparatus 100 may inform a user that the vehicle travels using the auxiliary drive wheel motor.

Figure 7:
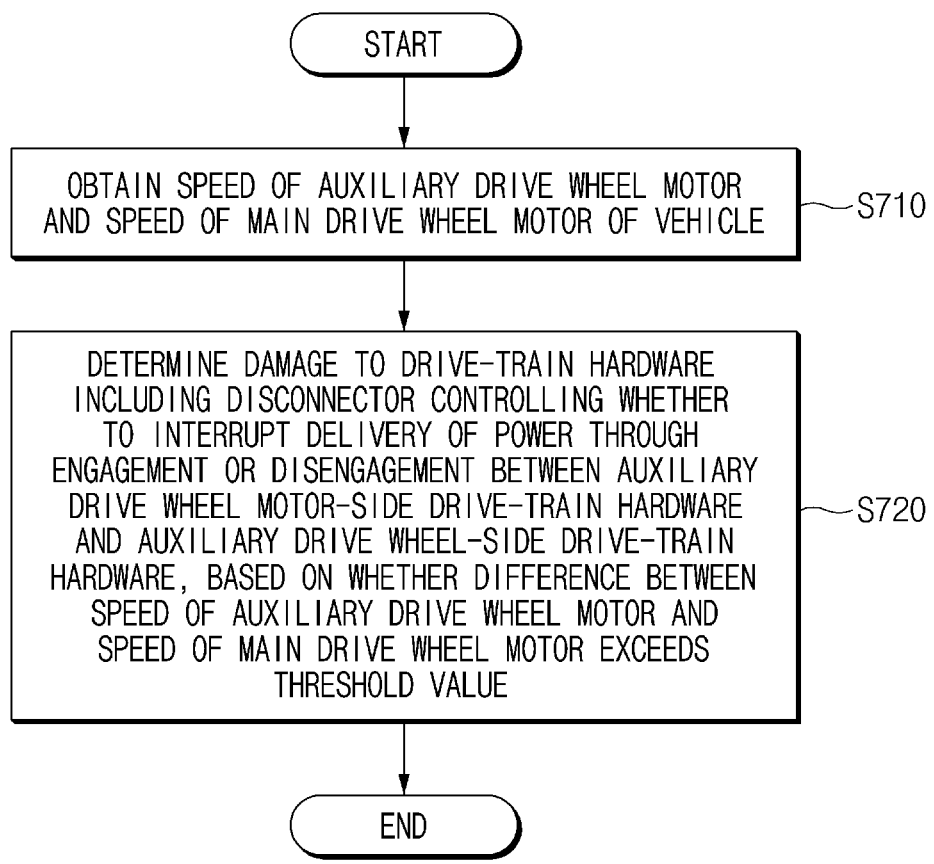
FIG. 7 is a flowchart illustrating a vehicle drive-train hardware damage diagnosis method according to various exemplary embodiments of the present invention.

FIG. 7 is a flowchart illustrating a vehicle drive-train hardware damage diagnosis method according to various exemplary embodiments of the present invention.

Referring to FIG. 7, the vehicle drive-train hardware damage diagnosis method may include step S710 of obtaining the speed of an auxiliary drive wheel motor and the speed of a main drive wheel motor of a vehicle and step S720 of determining damage to drive-train hardware including a disconnector that controls whether to interrupt delivery of power through engagement or disengagement between auxiliary drive wheel motor-side drive-train hardware and auxiliary drive wheel-side drive-train hardware, based on whether the difference between the speed of the auxiliary drive wheel motor and the speed of the main drive wheel motor exceeds a threshold value.

Step S710 of obtaining the speed of the auxiliary drive wheel motor and the speed of the main drive wheel motor of the vehicle may be performed through a wheel speed sensor included in the sensor 110.

Step S720 of determining damage to the drive-train hardware including the disconnector that controls whether to interrupt the delivery of the power through the engagement or the disengagement between the auxiliary drive wheel motor-side drive-train hardware and the auxiliary drive wheel-side drive-train hardware, based on whether the difference between the speed of the auxiliary drive wheel motor and the speed of the main drive wheel motor exceeds the threshold value may be performed by the controller 120.

The vehicle drive-train hardware damage diagnosis method may further include a step of obtaining at least one of the position of a sleeve of the disconnector, the position of a fork of the disconnector, or a current of a motor controlling the disconnector, a step of determining a defect in a system controlling the disconnector, based on at least one of the position of the sleeve of the disconnector, the position of the fork of the disconnector, or the current of the motor controlling the disconnector, and a step of determining that the drive-train hardware is not damaged, when it is determined that the system controlling the disconnector is defective.

For example, step S720 of determining damage to the drive-train hardware including the disconnector may include a step of determining damage to at least one of drive-train hardware delivering power from the auxiliary drive wheel motor to auxiliary drive wheels or drive-train hardware delivering power from the main drive wheel motor to main drive wheels, by comparing at least one of the speed of the auxiliary drive wheel motor or the speed of the main drive wheel motor with a reference motor speed.

For example, the step of determining damage to at least one of the drive-train hardware delivering the power from the auxiliary drive wheel motor to the auxiliary drive wheels or the drive-train hardware delivering the power from the main drive wheel motor to the main drive wheels may include a step of determining damage to at least one of the drive-train hardware delivering the power from the auxiliary drive wheel motor to the auxiliary drive wheels or the drive-train hardware delivering the power from the main drive wheel motor to the main drive wheels, by comparing at least one of a value obtained by integrating the change amount in the speed of the auxiliary drive wheel motor or a value obtained by integrating the change amount in the speed of the main drive wheel motor with a value obtained by integrating the change amount in the reference motor speed.

The operations of the method or the algorithm described in connection with the exemplary embodiments included herein may be embodied directly in hardware or a software module executed by a processor, or in a combination thereof. The software module may reside on a storage medium (that is, a memory and/or storage) such as a RAM, a flash memory, a ROM, an EPROM, an EEPROM, a register, a hard disk, a removable disk, or a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

The vehicle drive-train hardware damage diagnosis apparatus and method according to various exemplary embodiments of the present invention has the following effects.

According to at least one of the exemplary embodiments of the present invention, the vehicle drive-train hardware damage diagnosis apparatus and method may diagnose damage to drive-train hardware of a vehicle in which a disconnector is included.

According to at least one of the exemplary embodiments of the present invention, the vehicle drive-train hardware damage diagnosis apparatus and method may prevent divergence of motor RPM by diagnosing damage to drive-train hardware of a vehicle.

According to at least one of the exemplary embodiments of the present invention, the vehicle drive-train hardware damage diagnosis apparatus and method may prevent greater shocks or breakdowns and improve the safety of a driver by diagnosing damage to drive-train hardware of an electric vehicle all wheel drive (EV AWD) vehicle or an electric vehicle four wheel drive (EV 4WD) vehicle.

According to at least one of the exemplary embodiments of the present invention, the vehicle drive-train hardware damage diagnosis apparatus and method may minimize replacement of parts and save cost by diagnosing damage to drive-train hardware of a vehicle in a controlled way.

According to at least one of the exemplary embodiments of the present invention, the vehicle drive-train hardware damage diagnosis apparatus and method may ensure robustness of a system of an EV vehicle in which a disconnector is included, by diagnosing damage to drive-train hardware of the vehicle in which the disconnector is included.

Furthermore, the present invention may provide various effects that are directly or indirectly recognized.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus of diagnosing damage to drive-train hardware of a vehicle, the apparatus comprising:
    a sensor configured to obtain speed of an auxiliary drive wheel motor of the vehicle and speed of a main drive wheel motor of the vehicle; and
    a controller electrically connected to the sensor and configured to determine the damage to the drive-train hardware including a disconnector configured to control whether to interrupt delivery of power through engagement or disengagement between auxiliary drive wheel motor-side drive-train hardware and auxiliary drive wheel-side drive-train hardware, according to whether a difference between the speed of the auxiliary drive wheel motor and the speed of the main drive wheel motor exceeds a threshold value, wherein the controller is configured to:
        determine a defect in a system configured to control the disconnector, based on at least one of a position of a sleeve of the disconnector, a position of a fork of the disconnector, or a current of a motor configured to control the disconnector; and
        determine that the drive-train hardware is not damaged, when the controller concludes that the system configured to control the disconnector is defective.

2. The apparatus of claim 1,
    wherein the sensor obtains at least one of the position of the sleeve of the disconnector, the position of the fork of the disconnector, or the current of the motor configured to control the disconnector.

3. The apparatus of claim 1,
    wherein the controller is configured to determine the defect in the system configured to control the disconnector, based on whether at least one of the position of the sleeve of the disconnector, the position of the fork of the disconnector, or the current of the motor configured to control the disconnector is within a predetermined range, and
    wherein the predetermined range is determined depending on a degree of engagement of the disconnector.

4. The apparatus of claim 1, wherein the controller is configured to determine the damage to at least one of drive-train hardware configured to deliver power from the auxiliary drive wheel motor to auxiliary drive wheels or drive-train hardware configured to deliver power from the main drive wheel motor to main drive wheels, by comparing at least one of the speed of the auxiliary drive wheel motor or the speed of the main drive wheel motor with a reference motor speed.

5. The apparatus of claim 4, wherein the reference motor speed is determined based on at least one of acceleration or wheel speed of the vehicle.

6. The apparatus of claim 4,
    wherein the controller is configured to determine damage to at least one of the drive-train hardware configured to deliver the power from the auxiliary drive wheel motor to the auxiliary drive wheels or the drive-train hardware configured to deliver the power from the main drive wheel motor to the main drive wheels, by comparing at least one of a value obtained by integrating a change amount in the speed of the auxiliary drive wheel motor or a value obtained by integrating a change amount in the speed of the main drive wheel motor with a value obtained by integrating a change amount in the reference motor speed.

7. The apparatus of claim 4, wherein the controller is configured to:
    control the disconnector to a state in which power is not delivered to the auxiliary drive wheels, when the controller concludes that the drive-train hardware configured to deliver the power from the auxiliary drive wheel motor to the auxiliary drive wheels is damaged; and
    control the disconnector to a state in which power is delivered to the auxiliary drive wheels, when the controller concludes that the drive-train hardware configured to deliver the power from the main drive wheel motor to the main drive wheels is damaged.

8. The apparatus of claim 1, wherein the controller is configured to limit operation of the disconnector, when the controller concludes that the system configured to control the disconnector is defective.

9. The apparatus of claim 1, wherein the controller is configured to limit reflection of torque required by a driver of the vehicle, when the controller concludes that the drive-train hardware is damaged.

10. The apparatus of claim 4, wherein the controller is configured to:
limit at least one of power or torque of the auxiliary drive wheels, when the controller concludes that the drive-train hardware configured to deliver the power from the auxiliary drive wheel motor to the auxiliary drive wheels is damaged; and
limit at least one of power or torque of the main drive wheels, when the controller concludes that the drive-train hardware configured to deliver the power from the main drive wheel motor to the main drive wheels is damaged.

11. The apparatus of claim 7, wherein the controller is configured to inform, through a warning lamp, a user that the vehicle travels using the auxiliary drive wheel motor, when the controller concludes that the drive-train hardware configured to deliver the power from the main drive wheel motor to the main drive wheels is damaged.

12. The apparatus of claim 1, wherein the controller is configured to:
control the disconnector to a state in which power is delivered to auxiliary drive wheels, apply torque to the auxiliary drive wheel motor, and determine damage to the drive-train hardware again, when the controller concludes that drive-train hardware configured to deliver power from the auxiliary drive wheel motor to the auxiliary drive wheels is damaged; and
enter a failure mode, when the controller concludes again that the drive-train hardware is damaged.

13. A method for diagnosing damage to drive-train hardware of a vehicle, the method comprising:
obtaining, by a sensor, speed of an auxiliary drive wheel motor of the vehicle and speed of a main drive wheel motor of the vehicle;
determining, by a controller electrically connected to the sensor, damage to the drive-train hardware including a disconnector configured to control whether to interrupt delivery of power through engagement or disengagement between auxiliary drive wheel motor-side drive-train hardware and auxiliary drive wheel-side drive-train hardware, according to whether a difference between the speed of the auxiliary drive wheel motor and the speed of the main drive wheel motor exceeds a threshold value;
determining, by the controller, a defect in a system configured to control the disconnector, based on at least one of a position of a sleeve of the disconnector, a position of a fork of the disconnector, or a current of a motor configured to control the disconnector; and
determining, by the controller, that the drive-train hardware is not damaged, when the controller concludes that the system configured to control the disconnector is defective.

14. The method of claim 13, further including:
obtaining, by the sensor, at least one of the position of the sleeve of the disconnector, the position of the fork of the disconnector, or the current of the motor configured to control the disconnector.

15. The method of claim 13, wherein the determining of the defect in the system configured to control the disconnector includes:
determining, by the controller, the defect in the system configured to control the disconnector, based on whether at least one of the position of the sleeve of the disconnector, the position of the fork of the disconnector, or the current of the motor configured to control the disconnector is within a predetermined range, and
wherein the predetermined range is determined depending on a degree of engagement of the disconnector.

16. The method of claim 13, wherein the determining of the damage to the drive-train hardware includes:
determining, by the controller, damage to at least one of drive-train hardware configured to deliver power from the auxiliary drive wheel motor to auxiliary drive wheels or drive-train hardware configured to deliver power from the main drive wheel motor to main drive wheels, by comparing at least one of the speed of the auxiliary drive wheel motor or the speed of the main drive wheel motor with a reference motor speed, and
wherein the reference motor speed is determined based on at least one of acceleration or wheel speed of the vehicle.

17. The method of claim 16, wherein the determining of the damage to the at least one of the drive-train hardware configured to deliver the power from the auxiliary drive wheel motor to the auxiliary drive wheels or the drive-train hardware configured to deliver the power from the main drive wheel motor to the main drive wheels includes:
determining, by the controller, the damage to the at least one of the drive-train hardware configured to deliver the power from the auxiliary drive wheel motor to the auxiliary drive wheels or the drive-train hardware configured to deliver the power from the main drive wheel motor to the main drive wheels, by comparing at least one of a value obtained by integrating a change amount in the speed of the auxiliary drive wheel motor or a value obtained by integrating a change amount in the speed of the main drive wheel motor with a value obtained by integrating a change amount in the reference motor speed.

18. The method of claim 16, further including:
controlling, by the controller, the disconnector to a state in which power is not delivered to the auxiliary drive wheels, when the controller concludes that the drive-train hardware configured to deliver the power from the auxiliary drive wheel motor to the auxiliary drive wheels is damaged; and
controlling, by the controller, the disconnector to a state in which power is delivered to the auxiliary drive wheels, when the controller concludes that the drive-train hardware configured to deliver the power from the main drive wheel motor to the main drive wheels is damaged.

19. The method of claim 16, further including:
limiting, by the controller, at least one of power or torque of the auxiliary drive wheels, when the controller concludes that the drive-train hardware configured to deliver the power from the auxiliary drive wheel motor to the auxiliary drive wheels is damaged; and
limiting, by the controller, at least one of power or torque of the main drive wheels, when the controller concludes that the drive-train hardware configured to deliver the power from the main drive wheel motor to the main drive wheels is damaged.

20. The method of claim 18, further including:
informing, by the controller through a warning lamp, a user that the vehicle travels using the auxiliary drive wheel motor, when the controller concludes that the drive-train hardware configured to deliver the power from the main drive wheel motor to the main drive wheels is damaged.

\* \* \* \* \*